US007671854B2

(12) United States Patent
Permezel et al.

(10) Patent No.: US 7,671,854 B2
(45) Date of Patent: Mar. 2, 2010

(54) HIGH-POTENTIAL OUTPUT STAGE

(75) Inventors: Jean-Marie Permezel, Grenoble (FR); Gilles Troussel, Grenoble (FR); Eric Benoit, Tokyo (JP)

(73) Assignee: STMicroelectronics SA, Montrouge (FR)

( * ) Notice: Subject to any disclaimer, the term of this patent is extended or adjusted under 35 U.S.C. 154(b) by 1051 days.

(21) Appl. No.: 11/282,311

(22) Filed: Nov. 18, 2005

(65) Prior Publication Data

US 2006/0132478 A1 Jun. 22, 2006

(30) Foreign Application Priority Data

Dec. 1, 2004 (FR) .................................. 04 12719

(51) Int. Cl.

| | |
|---|---|
| ***G06F 3/038*** | (2006.01) |
| ***G09G 5/00*** | (2006.01) |
| ***G09G 3/28*** | (2006.01) |
| ***G09G 3/10*** | (2006.01) |
| ***G05F 1/10*** | (2006.01) |
| ***H02J 3/12*** | (2006.01) |
| ***G05F 1/00*** | (2006.01) |

(52) U.S. Cl. .......................... 345/211; 345/60; 345/63; 345/70; 345/213; 315/169.1; 315/169.4; 323/234; 323/274; 323/284

(58) Field of Classification Search .................. 345/60, 345/211-213, 70, 63, 204; 327/108, 110, 327/333; 326/80, 81, 62, 63, 68; 323/234; 315/169.1, 169.4

See application file for complete search history.

(56) References Cited

U.S. PATENT DOCUMENTS

| | | | | |
|---|---|---|---|---|
| 4,087,806 | A * | 5/1978 | Miller | 345/60 |
| 5,587,676 | A * | 12/1996 | Chowdhury | 327/108 |
| 6,057,726 | A * | 5/2000 | Sumida | 327/333 |
| 6,549,032 | B1 * | 4/2003 | Shumarayev et al. | 326/33 |
| 2004/0012411 | A1 * | 1/2004 | Guedon et al. | 326/86 |
| 2005/0073518 | A1 * | 4/2005 | Bontempi | 345/211 |
| 2005/0093585 | A1 * | 5/2005 | Seo | 327/108 |

FOREIGN PATENT DOCUMENTS

| | | | |
|---|---|---|---|
| KR | 20030067989 | * | 8/2003 |
| KR | 20030067989 A | * | 8/2003 |

OTHER PUBLICATIONS

Preliminary Search Report FR 0412719.

* cited by examiner

*Primary Examiner*—Bipin Shalwala
*Assistant Examiner*—Ilana Spar
(74) *Attorney, Agent, or Firm*—Hogan & Hartson LLP

(57) ABSTRACT

A high-potential output stage includes an output circuit to power a load with a variable high potential when it receives a low-level active input logic signal. It also includes a driving circuit which produces a high-level control logic signal as a function of the input logic signal to drive the output circuit which is powered by a DC high potential. The output stage also synchronizes the input logic signal with variations of the variable high potential.

19 Claims, 3 Drawing Sheets

HIGH-POTENTIAL OUTPUT STAGE

RELATED APPLICATION

The present application claims priority of French Patent Application No. 0412719 filed Dec. 1, 2004, which is incorporated herein in its entirety by this reference.

FIELD OF THE INVENTION

The invention relates to high-potential output stages, and is useful for controlling display panels. The invention has particular utility in controlling plasma display panels.

BACKGROUND OF THE INVENTION

A plasma display panel is a matrix type screen or panel formed by cells positioned at the intersections of rows and columns. A cell has a cavity filled with a rare gas, two control electrodes and a deposit of red, green or blue phosphorus. To create a light dot on the screen using a given cell, a potential difference is applied between the control electrodes of this cell to activate an ionization of the gas. This ionization is accompanied by an emission of ultraviolet rays. The creation of the light dot is obtained by the excitation of the deposited phosphorus by the emitted rays.

The cells are classically activated to create images by logic circuits producing control signals. The logic states of these signals determine the cells that are commanded to produce a light dot and the cells that are commanded not to produce any light dots. The logic circuits are generally powered at low voltage, for example a voltage of 5V or less. This voltage is not sufficient to directly drive the electrodes of the cells. Between the logic circuits and the cells to be controlled, power output stages are therefore used to convert the low-voltage control signals into high-voltage control signals.

The ionization of the gas of the cavities requires the application of high potentials for the control electrodes, in the range of about 100V. Furthermore, it is necessary to be able to provide the electrodes with high currents, in the range of several tens of milliamperes (and also to be able to receive these currents from these electrodes). Indeed, the electrodes may be represented schematically by equivalent capacitors having relatively high capacitance values of about 100 picofarads. The controlling of the electrodes is therefore equivalent to the control implemented for charging or discharging a capacitor.

In plasma display panels, it is generally desired to obtain signals (current and voltage signals) that have steep edges. This represents for example charging or discharging times of about 100 nanoseconds. Given the high potential to be attained and the size of the capacitive charge, this entails the assumption that it is possible to provide very high charging currents and absorb very high discharge currents that could go up to about 100 milliamperes.

A high-potential output stage receives a low-voltage logic signal at input, having its low state for example at 0V and its high state VDD typically at about 3 to 5V, and, at output, provides a control signal OUT to charge or discharge a load coupled to its output. The signal OUT is a high-voltage signal, typically in the range of 50 to 120V. In the case of a plasma display panel, the load is a cell of the panel which, from an electrical viewpoint, behaves like a capacitive load.

A high-potential output stage of this kind can work in two different modes: a mode known as a "direct" mode (the DC mode) and a mode called the "alternating" mode (AC mode).

In the DC mode, the high power supply potential is set at a value VPP-DC and is equal to the high state of the high-voltage logic. A change in state of the low-voltage input signal entails a change in state of the high-potential output signal.

In the AC mode, the power supply potential VPP-AC is equal to 0V for a half period and is variable during another half period: VPP-AC does a build-up, for example from 0V to VPP-DC in 200 nanoseconds, and then gets stabilized at this high value, for example for 400 nanoseconds, and then falls back to 0V, for example in 200 nanoseconds. If the input signal is in an active state (for example in the low state), then the potential of the output signal OUT is supposed to follow the variations of the potential VPP-AC. If, on the contrary, the input signal is in an inactive state (for example in the high state), the output potential OUT remains in the low state.

The passage of the potential of the output signal from the low state to the high state is produced by the charging of the output capacitor through a transistor.

In DC mode, this transistor works in saturation during almost the entire change in state. This leads to high dissipation in this transistor. In AC mode, it is sought to make this transistor work in ohmic conduction in order to limit the dissipation in the transistor. The AC mode therefore has the advantage of reducing the dissipation of the system as compared with the DC mode.

Here below, only circuits working in AC mode shall be dealt with.

A prior-art high-potential output stage is shown in FIG. 1. It includes a level shifter circuit 10, a control circuit 20, and an output circuit 30. The output stage powers a load Cout, represented in FIG. 1 by a capacitor. The output stage is powered by the high potential VPP-AC produced by an oscillator 40 from the DC power supply VPP-DC. Depending on the input signal IN, the output stage gives a signal OUT to the load Cout.

The level shifter 10 amplifies the input logic signal IN and produces a signal INP such that:

if IN=0, INP=0 if IN=VDD, INP=VPP-AC.

The circuit 30 has an N type, high-voltage output transistor T31 equipped with a Zener diode D33 antiparallel-mounted between the gate and the source of T31. The transistor T31 has an intrinsic diode D34 antiparallel-connected between its drain and its source. The circuit 30 also has another high-voltage N type transistor T32 coupled between the source of the transistor T31 and a ground terminal VSS. The common node of the transistors T31, T32 forms the output of the output stage, at which the signal OUT is produced.

The level shifter 10 and the control circuit 20 together form a driving circuit of the output circuit 30; the circuit 20 is formed by a high-voltage P type transistor T21 and a high-voltage N type transistor T22. T21, T22 are series-connected, the drain of T21 receiving the potential VPP-AC and the source of T22 being ground-connected. Starting from the signal INP applied to the gate of T21 and the signal IN applied to the gate of T22, this circuit 20 produces a control signal INH at the common drain of the transistors T21, T22. This control signal INH is applied to the gate of the output transistor T31. INH turns the transistor T31 on or off; INH depends on IN and on VPP-AC.

When the transistor T31 is activated by the signal INH, the output signal OUT follows the variations of the signal VPP-AC:

when VPP-AC rises, a charging current flows from the oscillator 40 to the load Cout through the transistor T31, to charge the load Cout and accordingly increase the potential OUT: T31 works in ohmic conduction, at least at the end of charging, when VPP-AC is constant at VPP-DC, OUT is constant and equal to VPP-DC−VT, VT being a potential threshold of T31, when VPP-AC decreases, a discharge current flows from the load Cout to the oscillator 40 through the diode. D34 of the transistor T31, to discharge the load Cout and reduce the potential OUT accordingly.

The overall working of the output stage in FIG. 1 is described in detail in the document D1 (US20040012411) or in the priority document FR2840468.

This output stage nevertheless has one drawback: T31 works in saturation at the beginning of the charging due to the high conduction threshold of the transistor T21 (in the range of 10V).

Indeed, so long as VPP-AC has not reached 10V, T21 is not conductive and INH remains at 0V, hence T31 is not conductive. When VPP-AC=10V, T21 is conductive and INH starts rising. When INH reaches a conduction threshold of T31 (in the range of 1.5V), T31 starts rising and the output builds up. However T31 is conductive with a high voltage (>10V) between its drain (VPP-AC) and its source (the output). Transistor T31 is therefore conductive in saturation. This results in substantial dissipation of power in the transistor T31, and that is detrimental.

However, as soon as the output has reached VPP-AC (in fact, setting aside Vds=Vgs, Vds and Vgs being respectively the drain/source voltage and the gate/source voltage of T31), T31 works in ohmic conduction and the dissipation is limited.

Document D1 proposes a solution to this problem. The solution comprises adding a control transistor parallel-connected to the transistor T21, between the drain and the gate of T31, and sized to have a low conduction threshold of about 1.5V. Thus, the transistor T31 starts conducting before VPP-AC reaches 10V; it therefore works very little in saturation, thus limiting the dissipated energy.

However, the dissipation remains as yet non-negligible. Furthermore, there is a risk of simultaneous conduction of the added control transistor and of the transistor T32 when the signal OUT is at the low level. This results in an additional dissipation of energy.

SUMMARY OF THE INVENTION

The present invention seeks to further reduce energy dissipation during the growth of the potential VPP-AC. The goal is attained in making the transistor T31 work only in ohmic conduction mode.

For this purpose, in the circuit according to the invention, the driving circuit is powered by the direct high potential VPP-DC and no longer by the variable high potential VPP-AC, while the output circuit for its part remains powered by the variable high potential VPP-AC, as in the prior-art circuits.

The direct high potential is always greater than the conduction threshold of the components of the driving circuit, so that these components come on as soon as they receive active control signals. In particular, the transistor T31 comes on as soon as the voltage between its drain and its source becomes greater than the conduction threshold, which is close to zero, as shall be seen more clearly here below. It follows from this that the energy dissipation in the output circuit is almost zero.

Preferably, the output stage of the invention also has means to synchronize the input logic signal IN with the variations of the variable high potential VPP-AC and the driving circuit producing the control logic signal as a function of the synchronized input logic signal.

The synchronization of the input logic signal with the variations of the variable high potential further limits the energy dissipation, especially when the variable high potential starts to vary as shall be seen more clearly here below.

To achieve the synchronization of the signal of the input logic signal with the variations of the variable high potential VPP-AC, the output stage of the invention uses a validation signal (VAL) which becomes active when the variable high potential VPP-AC starts increasing from a reference value (0V), then becomes inactive when the variable high potential VPP-AC starts decreasing from the value of the DC high potential VPP-DC. The output stage furthermore uses a logic gate to combine the validation signal (VAL) and the input logic signal IN.

The validation signal may be generated by a detector coupled so as to detect the level of the variable high potential (coupled for example between the output of an oscillator and a power supply input of the output stage). The validation signal may also be a simple logic signal given by an independent control circuit.

The invention also relates to a display panel comprising at least one cell to create a light dot on the panel, and an addressing circuit to produce a logic input signal of the cell. The panel also has an output stage of the invention, as described here above, to control the cell from the input logic signal. The screen is, for example, of a plasma screen type or flat screen type.

BRIEF DESCRIPTION OF THE DRAWINGS

The invention will be understood more clearly and other features and advantages shall appear from the following description of an exemplary implementation of an output stage of the invention. The description must be read with reference to the appended drawings, of which.

DETAILED DESCRIPTION

Figure 2:
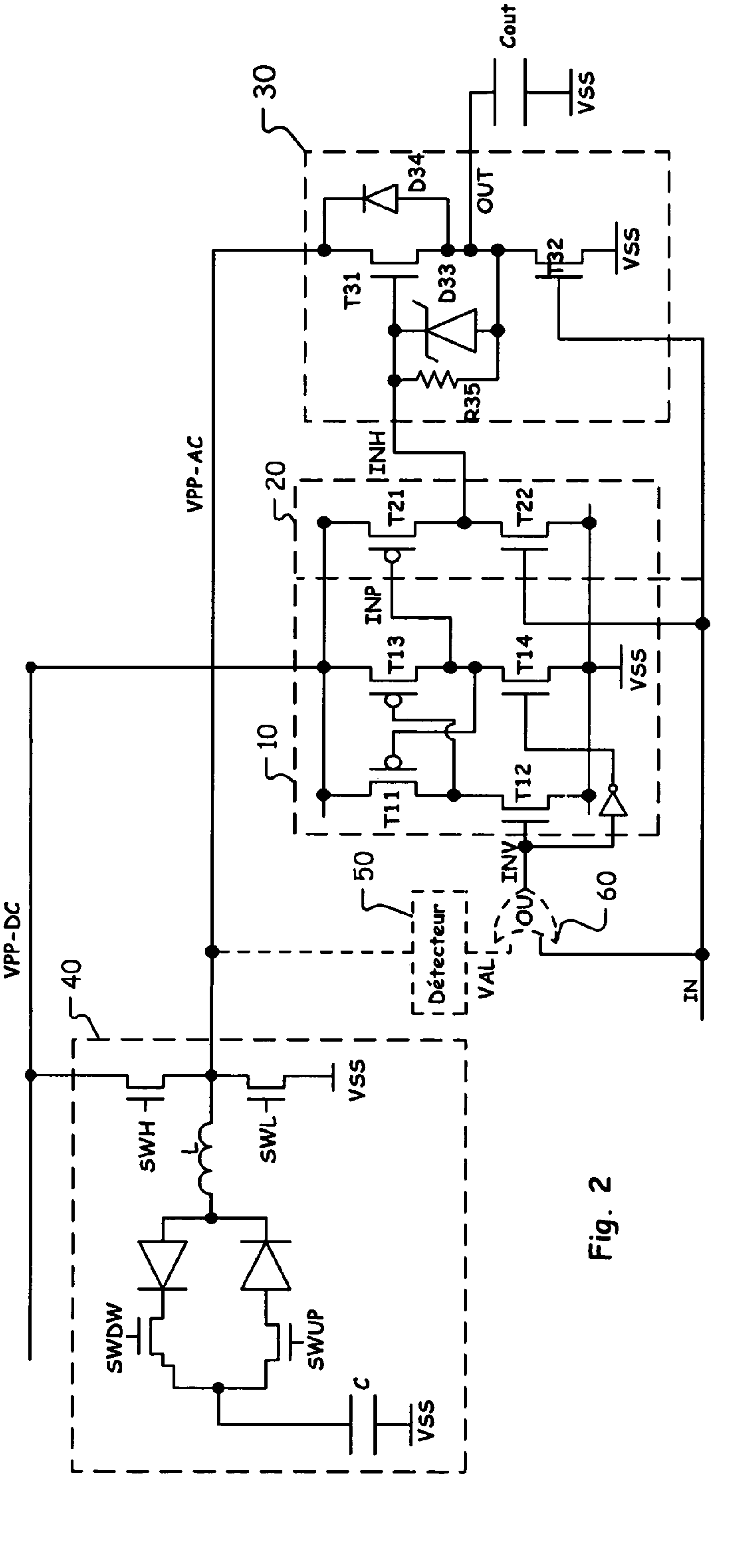
FIG. 2 is a diagram of an output stage according to the invention.

Referring now to FIG. 2, the level shifter 10 and the control circuit 20 are supplied with high power no longer by the variable potential VPP-AC, but directly by the direct potential VPP-DC. The output circuit 30 for its part remains powered by the potential VPP-AC.

According to an embodiment of the present invention, transistors T11, T13 and T21 receive the direct potential VPP-DC at their source. Since VPP-DC is always higher than the conduction threshold of 10V of these transistors, they come on as soon as they receive an appropriate signal (depending on the signal IN) at their control gate. Transistor T31 thus always works in ohmic conduction mode, never in saturation mode. There is therefore very little thermal dissipation at the level of the transistor T31.

The circuit of the present invention is advantageously complemented by a potential level detector 50 and a logic gate 60, in this case an OR type logic gate. The choice of the logic gate depends solely on the choice of the active level (0 or 1) of the signals VAL, IN and INV (in the example, all active at 0).

The detector 50 has the function of measuring the level of the potential VPP-AC and of producing an active validation signal VAL (in one example active at 0) when:

VPP-AC starts increasing from 0,

VPP-AC starts decreasing from VPP-DC.

Just like the signal IN, the signal VAL is a low-level logic signal.

The logic gate 60 combines the signals IN and VAL to produce a signal INV that is applied to the input of the level shifter 10. In other words, the gate 60 produces a control signal INV that is a function of the control signal IN and is synchronized with the variations of the potential VPP-AC. The signal INV is active here at 0:

INV is active if IN and VAL are active (all three at 0)

INV is inactive if IN or VAL is inactive (IN=1 or VAL=1).

Figure 1:
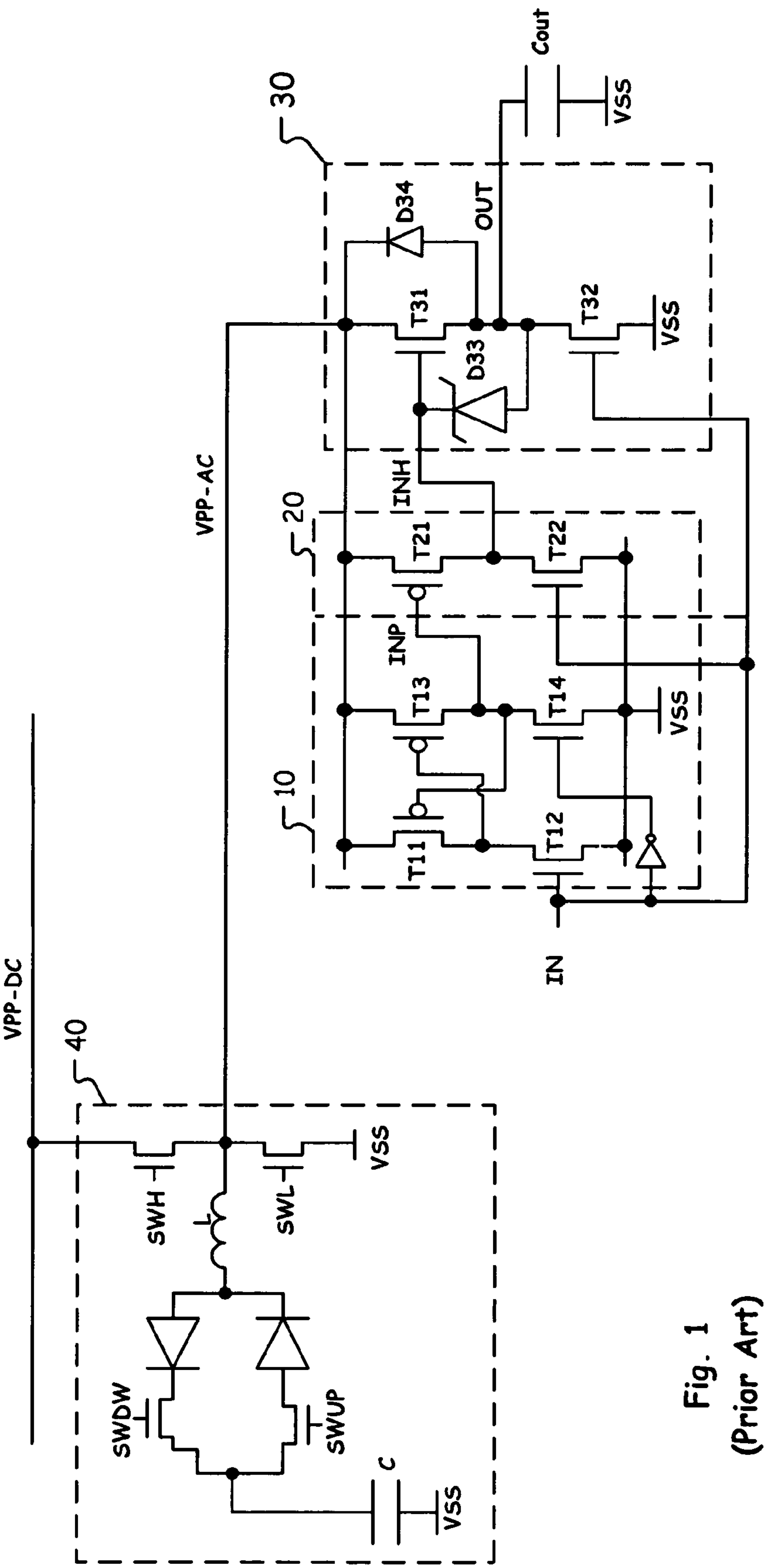
Fig. 1 (Prior Art)
FIG. 1 is a diagram of a prior art output stage.

The signal INV is used to command the transistors T21, T31. The signal IN is furthermore, as in the case of FIG. 1, applied directly gate of T22 and T32.

The use of the signal INV, synchronized with the signal VPP-AC, to command the level shifter 10 enables the energy consumption to be limited for the following reasons.

Reason 1: if the signal IN becomes active before the potential VPP-AC starts rising (from zero).

In the absence of a detector 50 and of the gate 60, the transistors T11, T13 and T21 are controlled directly by the signal IN. Since the potential VPP-DC applied to the source of T11, T13 and T21 is higher than their threshold potential, these transistors come on immediately when IN becomes active and a current flows in their channel, thus causing the build-up of the potential of the signal INH and the conduction of the transistor T31. With VPP-AC at the drain of T31 being initially equal to 0, the signal OUT remains at 0, and this results in a difference of potential (INH−OUT) between the gate and the source of T31 and between the terminals of the diode D33. When INH attains the Zener voltage of the Zener diode D33 (i.e. about 5V), this diode comes on (in reverse) and a current flowing in T21 flows into the load Cout. In the absence of the detector 50 and of the gate 60, there is therefore high dissipation in T21 because T21 works in saturation.

However, in the presence of the detector 50 and of the gate 60, the transistors T11, T13 and T21 are commanded by the signal INV, synchronized with the signal VPP-AC. Since the potential VPP-DC applied to the source of T11, T13 and T21 is higher than their threshold potential, these transistors come on immediately when INV becomes active and a current flows in their channel, thus leading to the build-up of the potential of the signal INH and the conduction of the transistor T31, simultaneously with the build-up of the potential VPP-AC. A current therefore flows in the transistor T31, the signal OUT rises and the load Cout gets charged. The difference in potential (INH−OUT) between the gate and the source of T31 and between the terminals of the diode D33 remains low since VPP-AC increases at the same time as INH. The diode D33 therefore remains off: there is only very little dissipation in T21 in the presence of the detector 50 and of the gate 60.

Reason 2: if the signal IN is now active after the potential VPP-AC has started decreasing (from VPP-DC).

When the potential VPP-AC starts decreasing, the charge Cout start getting discharged and the potential and the source and the gate of T31 diminish.

In the absence of the detector 50 and of the gate 60, the transistors T11, T13 and T21 are controlled directly by the signal IN. T21 is not yet off when VPP-AC starts decreasing, T22 and T32 being, on the contrary, off. The current flows from the output through D34 (intrinsic diode of T31) toward the oscillator 40, but also from the potential source producing VPP-DC through T21, D33 and D34 toward the oscillator 40, while giving rise to a dissipation of energy.

However, in the presence of the detector 50 and of the gate 60, the transistors T11, T13 and T21 are commanded by the signal INV. T21 and T31 are turned off by the signal INV (which has become inactive when VPP-AC started decreasing), T22 and T32 being for their part turned off by the signal IN. The output is then at high impedance, the load Cout get discharged through D34 but no current flows in T21 and D34: hence there is only very little energy dissipation in the presence of the detector 50 and of the gate 60.

Synchronizing the signal IN with the variations of the signal VPP-AC therefore further limits the energy consumption, especially at the build-up and the build-down of VPP-AC.

The circuit of FIG. 2 may also be improved by adding a resistor R35 in a parallel connection on the diode D33. In the high-impedance state, when the transistors T21 and T22 are simultaneously off, the resistor R35 prevents the common point between the transistors T21 and T22 from being floating and the signal INH from reaching a level sufficient to prompt a return to conduction of T31.

Figure 3:
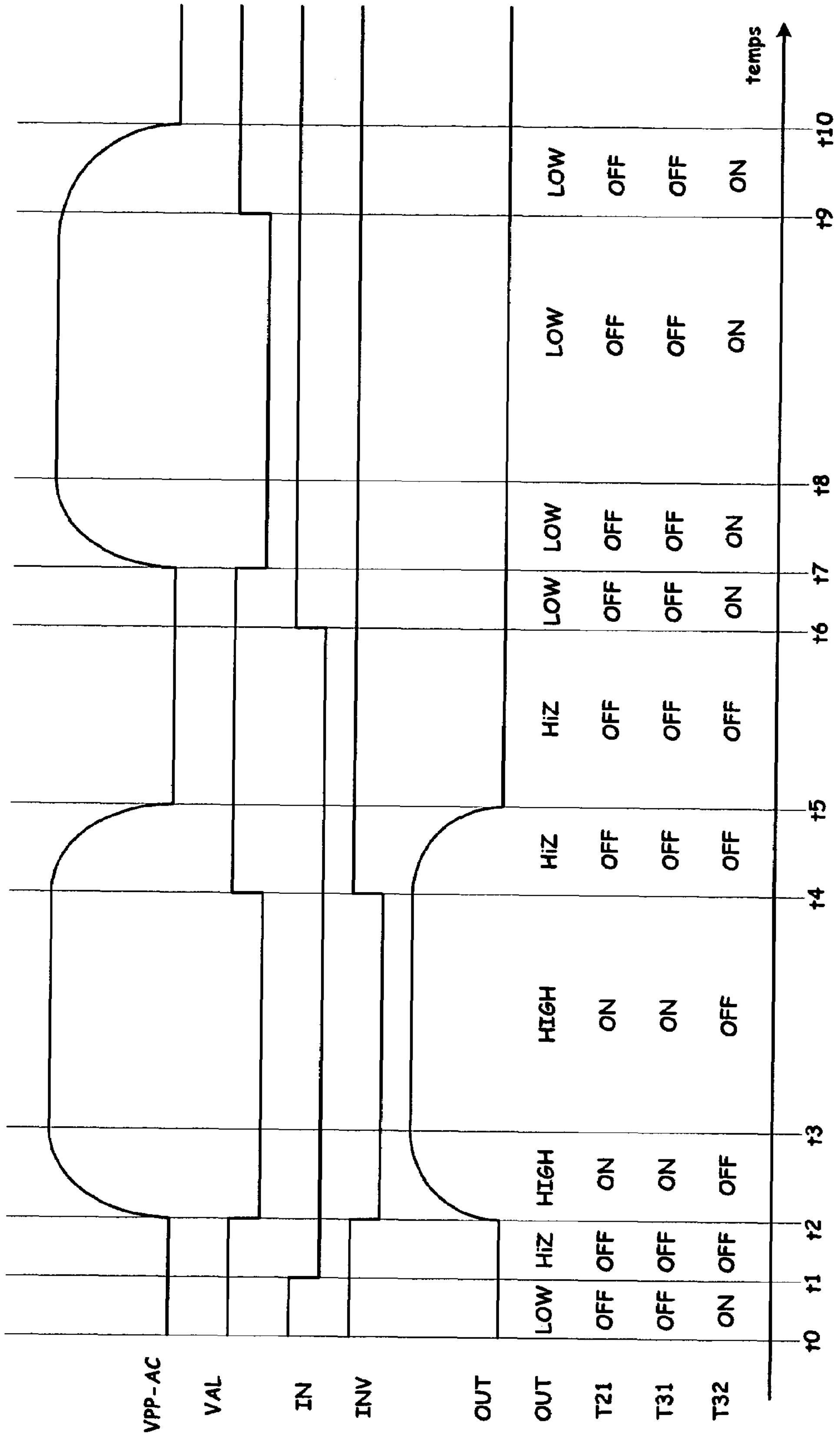
FIG. 3 shows the progress in time of signals at different points of the circuit of FIG. 2 and the state of certain transistors of the circuit of FIG. 2.

The overall working of the circuit of FIG. 2 shall now be described in one example with reference to the timing diagrams of FIG. 3, which shows the progress in time:

of the signals VPP-AC, VAL, IN, INV and OUT, of the state, on (ON) of off (OFF) of the transistors T21, T31, T32.

It is assumed in the example that the variations of the signal VPP-AC are the following:

VPP-AC=0 between t0 and t2,

VPP-AC rises from 0 to VPP-DC between t2 and t3

VPP-AC=VPP-DC between t3 and t4

VPP-AC decreases from VPP-DC to 0 between t4 and t5

VPP-AC=0 between t5 and t7

VPP-AC=rises from 0 to VPP-DC between t7 and t8,

VPP-AC=VPP-DC between t8 and t9

VPP-AC increases from VPP-DC to 0 between t9 and t10

VPP-AC=0 beyond t10

It is also assumed that the variations of the signal IN are the following:

IN=1 (inactive) between t0 and t1,

IN=0 (active) between t1 and t6,

IN=1 (inactive) beyond t6.

The signal VAL produced by the detector 50 according to the invention varies according to the variations of the signal VPP-AC:

VAL=1 (inactive) between t0 and t2,

VAL=0 (active) between t2 and t4,

VAL=1 (inactive) between t4 and T7,

VAL=0 (active) between t7 and t9,

VAL=1 (inactive) beyond t9.

Since the signal INV is the combination (logic OR) of the signals IN and VAL, the variations of INV are deduced therefrom:

INV=1 (inactive) between t0 and t2

INV=0 (active) between t2 and t4

INV=1 (inactive) beyond t4

Through the level shifter 10, the signal INV controls the transistor T21 which itself controls the transistor T31. Thus:

T21, T31 are off (OFF) between t0 and t2

T21, T31 are on (ON) between t2 and t4

T21, T31 are off (OFF) beyond t4

The signal IN for its part commands the transistors T22 and T32. Thus:

T22, T32 are on (ON) between t0 and t1

T22, T32 are off (OFF) between t1 and t6

T22, T32 are on (ON) beyond t6

From the state of the transistors T31, T32, finally the variations of the signal OUT are deduced:

OUT=0 (LOW) between t0 and t1 (t31 off and t32 on);

OUT at high impedance (HiZ) between t1 and t2 (t31, t32 off simultaneously);

OUT=VPP-AC−VT (HIGH) between t2 and t4 (t31 on, t32 off);

OUT at high impedance (HiZ) between t4 and t6 (t31, t32 off simultaneously);

OUT=0 (LOW) beyond t6 (t31 off and t32 on).

It must be noted that, between t2 and t3, during the phase of growth of VPP-AC, when the potential OUT rises, a charging current produced by the oscillating circuit 40 powers the load Cout. Inversely, between t4 and t5, when the potential VPP-AC decreases, the signal OUT is at high impedance and the load Cout gets discharged by means of a current flowing from the load to the oscillating circuit 40 by means of the intrinsic diode D34 of the transistor T31.

In preferred embodiments of the present invention, the output stage of the present invention is associated with a display screen having at least one cell which creates a light dot on the screen and an addressing circuit to produce an input logic signal of the cell. The output stage controls the cell from the input logic signal. The preferred display screen type is a plasma display panel or flat panel type screen. Most typically, the display screens will have a plurality of such cells.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

The invention claimed is:

1. A high-potential output stage comprising:

an output circuit to power a load with a variable high potential when it receives a low-level active input logic signal;

a driving circuit producing a high-level control logic signal as a function of the input logic signal, to drive the output circuit, wherein the driving circuit is powered by a direct high potential;

a detector circuit to synchronize the input logic signal with variations of the variable high potential, the driving circuit producing the control logic signal as a function of the synchronized input logic signal, wherein the detector circuit comprises a detector to detect the level of the variable high potential and produce a validation signal that becomes active when the variable high potential starts increasing from a reference value, then inactive when the variable high potential starts decreasing from the value of the direct high potential, wherein the direct high potential and the reference value comprise different DC voltages; and a logic gate to combine the validation signal and the input logic signal.

2. The output stage according to claim 1, further comprising an oscillator to produce the variable high potential from the direct high potential.

3. The output stage according to claim 1, wherein the driving circuit comprises:

a level shifter to raise the potential of the input logic signal; and a control circuit to produce the high-level control logic signal as a function of the input logic signal with raised potential.

4. The output stage according to claim 1, wherein the output stage is associated with a display screen, the display screen comprising:

at least one cell to create a light dot on the screen; and an addressing circuit to produce an input logic signal of the cell, wherein the output stage controls the cell from the input logic signal.

5. The output stage according to claim 4, wherein the display screen is a plasma display panel or a flat panel type screen.

6. The output stage according to claim 2, wherein the output stage is associated with a display screen, the display screen comprising:

at least one cell to create a light dot on the screen; and an addressing circuit to produce an input logic signal of the cell, wherein the output stage controls the cell from the input logic signal.

7. The output stage according to claim 6, wherein the display screen is a plasma display panel or a flat panel type screen.

8. The output stage according to claim 3, wherein the output stage is associated with a display screen, the display screen comprising:

at least one cell to create a light dot on the screen; and an addressing circuit to produce an input logic signal of the cell, wherein the output stage controls the cell from the input logic signal.

9. The output stage according to claim 8, wherein the display screen is a plasma display panel or a flat panel type screen.

10. The output stage according to claim 2, wherein the output stage is associated with a display screen, the display screen comprising:

at least one cell to create a light dot on the screen; and an addressing circuit to produce an input logic signal of the cell, wherein the output stage controls the cell from the input logic signal.

11. The output stage according to claim 10, wherein the display screen is a plasma display panel or a flat panel type screen.

12. The output stage according to claim 3, wherein the output stage is associated with a display screen, the display screen comprising:

at least one cell to create a light dot on the screen; and an addressing circuit to produce an input logic signal of the cell, wherein the output stage controls the cell from the input logic signal.

13. The output stage according to claim 12, wherein the display screen is a plasma display panel or a flat panel type screen.

14. An output stage comprising:

an output circuit having a power terminal for receiving an AC signal, first and second inputs, and an output;

a control circuit having a power terminal for receiving a DC voltage, first and second inputs, and an output coupled to the first input of the output circuit;

a level shifting circuit having a power terminal for receiving the DC voltage, an input, and an output coupled to the first input of the control circuit;

a detector having an input for receiving the AC signal, and an output to detect the level of the AC signal and to produce a validation signal that becomes active when the AC signal starts increasing from a reference value, then inactive when the variable high potential starts decreasing from the value of the DC voltage wherein the DC voltage and the reference value comprise different DC voltages; and a logic circuit having a first input coupled to the output of the detector, a second input coupled to the second inputs of the control circuit and the output circuit for receiving an input signal.

15. The output stage according to claim 14 further comprising a display screen load coupled to the output of the output circuit.

16. The output stage according to claim 14 wherein the output circuit comprises:

a first N-channel transistor having a drain for the receiving the AC signal, a gate coupled to the first input, and a source coupled to the output; and a second N-channel transistor having a drain coupled to the output, a gate coupled to the second input, and a source coupled to ground.

17. The output stage according to claim 14 wherein the control circuit comprises:

a P-channel transistor having a source for receiving the DC voltage, a gate coupled to the first input, and a drain coupled to the output; and an N-channel transistor having a drain coupled to the output, a gate coupled to the second input, and a source coupled to ground.

18. The output stage according to claim 14 wherein the level shift circuit comprises:

a first P-channel transistor having a source for receiving the DC voltage, a gate coupled to the output, and a drain;

a second P-channel transistor having a source for receiving the DC voltage, a gate coupled to the drain of the first P-channel transistor, and a drain coupled to the output;

a first N-channel transistor having a drain coupled to the drain of the first P-channel transistor, a gate coupled to the input, and a source coupled to ground;

a second N-channel transistor having a drain coupled to the output, a gate, and a source coupled to ground; and an inverter coupled between the input and the gate of the second N-channel transistor.

19. The output stage according to claim 14 wherein the logic circuit comprises an OR gate.

* * * * *